United States Patent [19]
Okada et al.

[11] Patent Number: 5,990,867
[45] Date of Patent: Nov. 23, 1999

[54] WIRELESS INPUT DEVICE AND WIRELESS INPUT METHOD WHICH AUTOMATICALLY REDUCES TRANSMITTED DATA ACCORDING TO DATA SIZE

[75] Inventors: Hiroyasu Okada, Kawanishi; Hiroaki Nishiono, Osaka; Shinji Kamaeguchi, Kadoma; Mitsuo Kodama, Tsuruga; Masanori Kusunoki, Osaka, all of Japan

[73] Assignee: Matsushita Electric Industrial Co., Ltd., Osaka, Japan

[21] Appl. No.: 08/705,510

[22] Filed: Aug. 29, 1996

[30] Foreign Application Priority Data

Aug. 30, 1995 [JP] Japan ................................. 7-221369

[51] Int. Cl.$^6$ ................................................. G06F 17/30
[52] U.S. Cl. ................................. 345/158; 345/157
[58] Field of Search .................................... 345/158, 157; 370/472, 913, 310, 311, 465, 470, 473, 476; 340/825.63, 825.69, 825.72

[56] References Cited

U.S. PATENT DOCUMENTS

| | | |
|---|---|---|
| 4,156,111 | 5/1979 | Downey et al. ........................ 370/472 |
| 4,464,718 | 8/1984 | Dixon et al. . |
| 4,502,038 | 2/1985 | Lowenthal et al. . |
| 5,029,183 | 7/1991 | Tymes . |
| 5,243,699 | 9/1993 | Nickolls et al. . |
| 5,258,999 | 11/1993 | Wernimont et al. . |
| 5,321,750 | 6/1994 | Nadan . |
| 5,414,859 | 5/1995 | Staudacher et al. . |
| 5,602,831 | 2/1997 | Gaskill ................................. 370/252 |

*Primary Examiner*—Thomas G. Black
*Assistant Examiner*—William Trinh
*Attorney, Agent, or Firm*—Ratner & Prestia

[57] ABSTRACT

In a wireless input transmission device, data is entered by input means such as pointing device, the value of the data is checked when transmitting the data, and when the data value is small and does not require the specified number of bits, the number of bits is decrease to one half or one quarter, or the difference from the previous time is transmitted, or the data is omitted if the present data is same as the previous data, and such information is given to the data quantity information bit, and data to be transmitted, data quantity information bit, and necessary data for transmission are added, and the transmission data is composed by decreasing the data quantity in one-input information depending on the data value and transmitted to the wireless receiver, where the transmission data is decoded according to the data quantity information bit and the received result is sent by wire to the main apparatus such as personal computer, word processor, other information processing apparatus, or household game machine, thereby preventing increase of current consumption used in communication in the wireless input transmission device and extending the battery life.

16 Claims, 8 Drawing Sheets

WIRELESS INPUT DEVICE AND WIRELESS INPUT METHOD WHICH AUTOMATICALLY REDUCES TRANSMITTED DATA ACCORDING TO DATA SIZE

FIELD OF THE INVENTION

The present invention relates to a wireless input device and wireless input method for entering data by wireless into information processing apparatus such as personal computer and word processor, or household game machine or the like.

BACKGROUND OF THE INVENTION

Hitherto, this kind of wireless input device was composed as shown in FIG. 1. Concerning this constitution, an example of household game machine is described below.

As shown in FIG. 1 (A), a wireless input transmission device 11 comprises input means not shown, such as keyboard switches and pointing device, and is designed to communicate with a wireless receiver 12 one way or two ways. The wireless receiver 12 is connected to a main body 13 such as information processing apparatus or game machine through a cable 14.

Data generated by input means of the wireless input transmission device 11, that is, one-input information to be communicated between the wireless receiver 12 and the main body 13 through cable is supposed to be composed of three bytes as shown in FIG. 1 (B). That is, in first byte, bit 0 indicates left switch on/off, bit 1 right switch on/off, bit 4 and bit 5 respectively positive direction or negative direction of X- and Y-axis, and other bit 2, bit 3, bit 6, and bit 7 are not used. In second byte and third byte, data in X- and Y-direction (0 to 255) are indicated by eight bits each of bit 0 to bit 7.

In this one-input information, for wireless communication between the wireless input transmission device 11 and wireless receiver 12, by adding a new byte or the like for guaranteeing data aside from the data in FIG. 1 (B), wireless communication is effected by using a same number or equivalent or greater number of bytes (in this example, N bytes) as compared with the case of wired communication.

In such conventional constitution, however, in the case of wireless communication with the main body 13 which is, for example, a personal computer, as the quantity of input information increases, the current consumption spent in communication increases, and the battery life of the wireless input transmission device 11 is extremely shortened, which gives rise to a problem of frequent exchange of batteries.

SUMMARY OF THE INVENTION

The invention is intended to solve the problems of the prior art, and it is an object thereof to save the current consumption of the apparatus used in communication, or wireless input transmission device, in particular, by curtailing the quantity of data used in communication, and extend the battery life.

The wireless input device of the invention comprises the following components and wireless input method comprises the following steps in order to achieve the object.

That is, in the wireless input transmission device, data is entered from input means such as pointing device, and when transmitting the data by wireless, the value of the data is checked, and in the case the data is small in value and does not require a specified number of bits, various processings are done, for example, the number of bits is decreased to one half or one quarter, or the difference from the previous time is transmitted by wireless, or data is omitted if the data is same as the previous time.

To notice such processing to the reception side, the data quantity information bit is provided in the wireless communication data.

Accordingly, the quantity of data of one-input information is thus decreased, and the wireless communication data is composed by including the data quantity information bit indicating the purpose, and is sent from the wireless input transmission device to the wireless receiver. In the wireless receiver, the wireless communication data is decoded according to the data quantity information bit. The received result is sent by wire to the main apparatus such as personal computer, word processor, other information processing apparatus, or household game machine.

According to the device and method of the invention, when transmitting one-input information initially composed of plural bytes or long bytes from the wireless input transmission device to the wireless receiver, by communicating by decreasing the number of bytes for composing the one-input information depending on the content of the data or decreasing the number of bits in one byte, the current spent in communication is saved, so that the battery life can be extended.

BRIEF DESCRIPTION OF THE DRAWINGS

FIG. 1 (B) is a diagram showing a format of input information of wireless input transmission device of the conventional wireless input device:

FIG. 2 (B) is a diagram showing a format of input information of wireless input transmission device of the wireless input device in the first embodiment of the invention;

FIG. 3 (B) is a diagram showing a format of input information from the pointing device of wireless input transmission device in the wireless input device of the invention;

FIG. 4 (B) is a diagram showing a format in an example of two-byte communication of input information of wireless input transmission device in the wireless input device in the first embodiment of the invention;

FIG. 5 (B) is a diagram showing a format in an example of one-byte communication of input information of wireless input transmission device in the wireless input device in the first embodiment of the invention;

FIG. 6 (B) is a diagram showing a format of transmission of input information of wireless input transmission device of the wireless input device in the second embodiment of the invention;

FIG. 7 (B) is a diagram showing a format of differential communication of input information of wireless input transmission device of the wireless input device in the second embodiment of the invention;

DETAILED DESCRIPTION OF THE INVENTION

A first embodiment of the invention applied in a household game machine is described below while referring to FIG. 2 and FIG. 3.

Figure 1A:
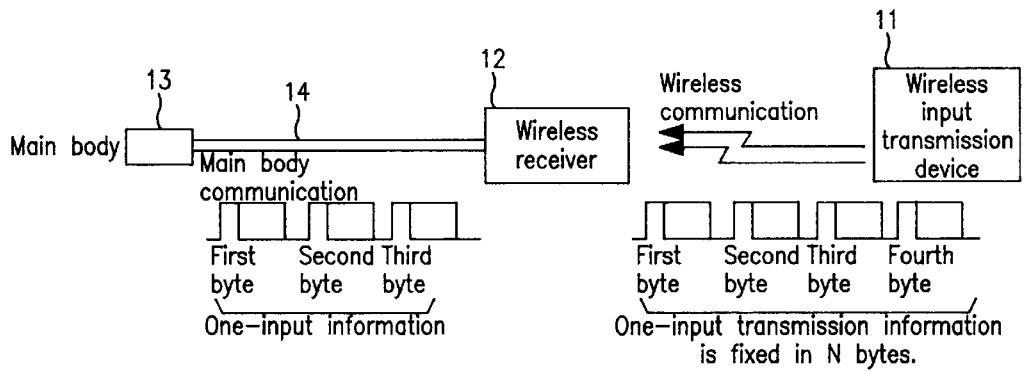
FIG. 1 (A) is a block diagram adding input information of wireless input transmission device of a conventional wireless input device.
Figure 1B:
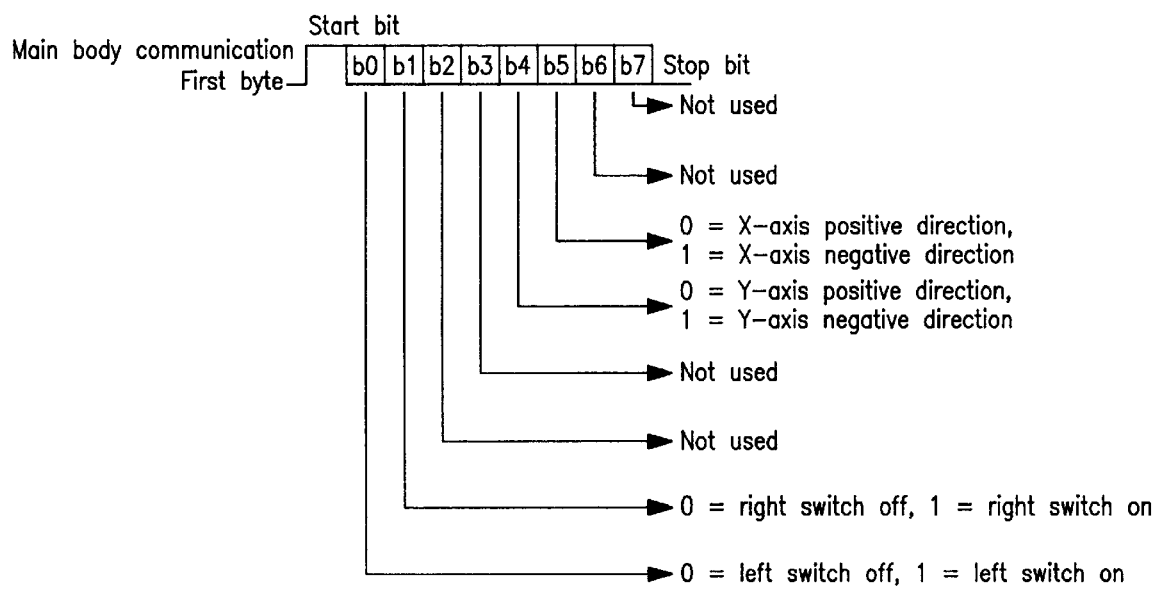
Figure 1B:
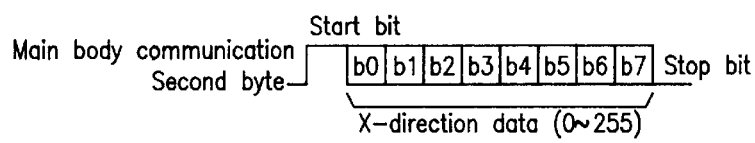
Figure 1B:
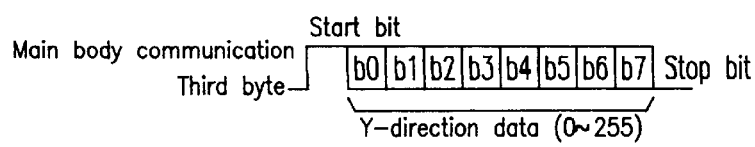
Figure 2A:
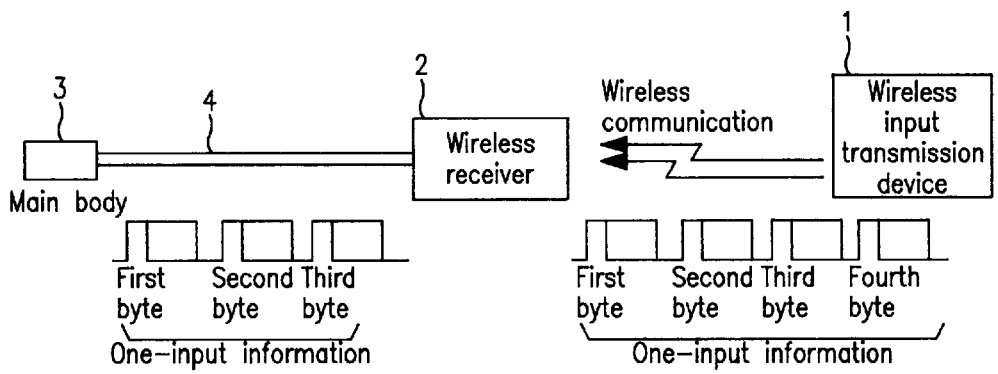
FIG. 2 (A) is a block diagram adding input information of wireless input transmission device of a wireless input device in a first embodiment of the invention.
Figure 2B:
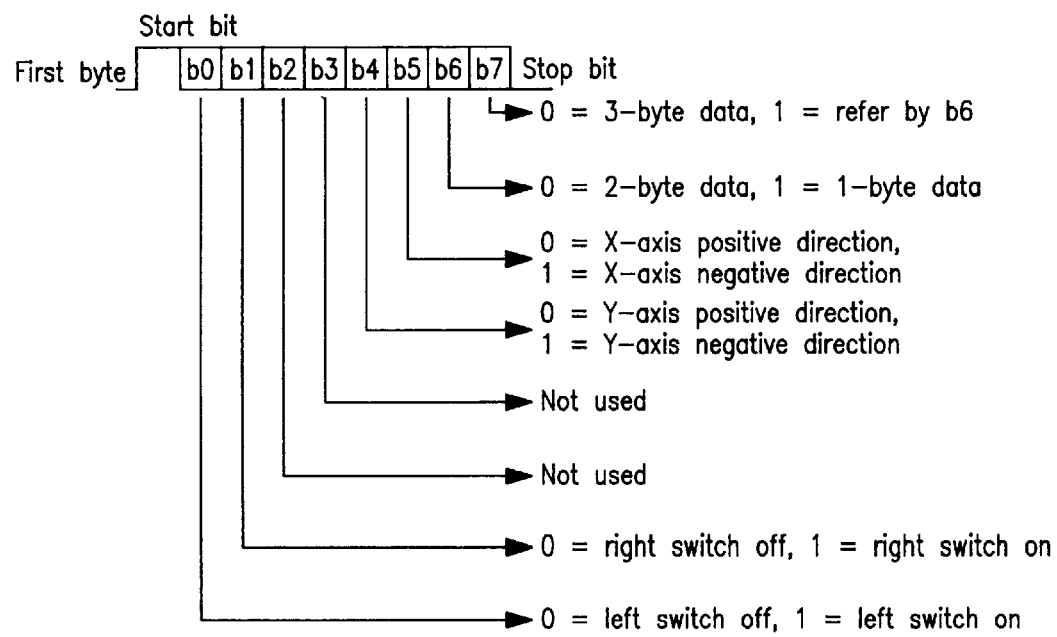
Figure 2B:
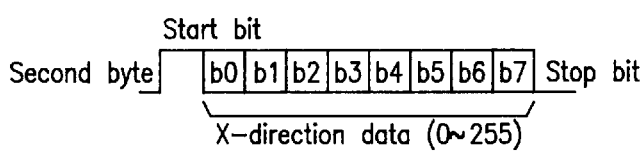
Figure 2B:
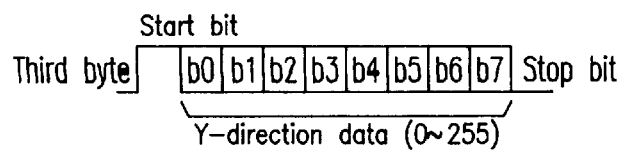
Figure 3A:
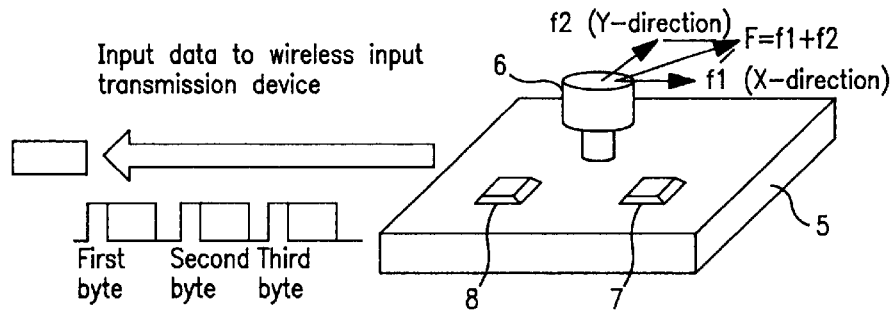
FIG. 3 (A) is a perspective view of a pointing device adding input information of wireless input transmission device in the wireless input device of the invention.
Figure 3B:
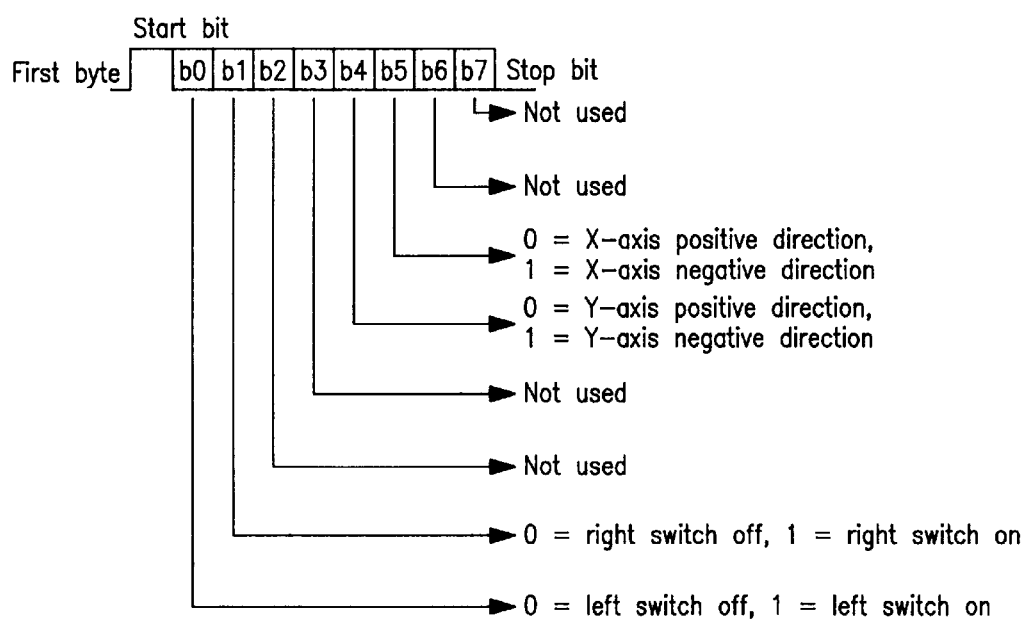
Figure 3B:
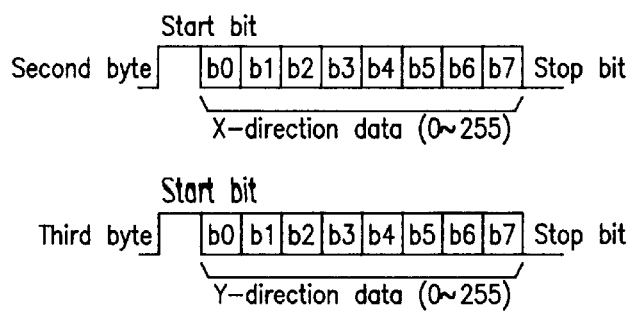

As shown in FIG. 2 (A), a wireless input transmission device 1 incorporates a pointing device 5 like a stick as shown in FIG. 3 (A) as input means. A wireless receiver 2 is connected so as to receive a wireless signal from the wireless input transmission device 1, and transmit necessary information to a main body 3 through a cable 4.

Explaining the pointing device 5 by referring to an example of stick in FIG. 3 (A), the pointing device 5 is a device for moving and pointing a cursor on a display screen, not shown, connected to the main body 3 up to a desired position on the screen pointing means (instructing the arrival at the desired position), and when a force is applied by hand on an operation axis 6 in a direction desired to move the cursor on the screen, the move data in the X-direction and Y-direction is generated for moving the cursor, depending on the direction and magnitude of the force being applied. A right switch 7 and a left switch 8 are for pointing by switch on/off operation after moving the cursor to a desired position.

One-input information of such pointing device 5 is, as shown in FIG. 3, usually composed of three bytes consisting of on/off information of right switch 7 and left switch 8, move data in X- and Y-direction, and direction of move data and other information.

In this embodiment, as shown in FIG. 2 (B). the one-input information transmitted by wireless from the wireless input transmission device 1 to the wireless receiver 2, and further transmitted from the wireless receiver 2 to the main body 3 is basically composed in a format of three bytes, and referring first to the wireless transmission from the wireless input transmission device 1 to the wireless receiver 2, the first byte is composed of on/off information of right and left switches 7, 8 of the pointing device 5, information about direction of data in X- and Y-direction, and information showing the number of bytes necessary for communication of one-input information of bit 6 and bit 7 or number of digits of data of wireless communication, that is, data quantity information bits.

The second byte and third byte are data in X- and Y-direction, respectively, and transmit data from 0 to 255 in eight bits each from bit 0 to bit 7.

In the communication from the wireless receiver 2 to the main body 3, the communication content received from the wireless input communication device 1 is decoded by using data quantity information bits of the first byte, and three bytes are used by excluding bit 6 and bit 7 of the data quantity information bits of the first byte from the content of one-input information transmitted from the wireless input transmission device 1.

Figure 4A:
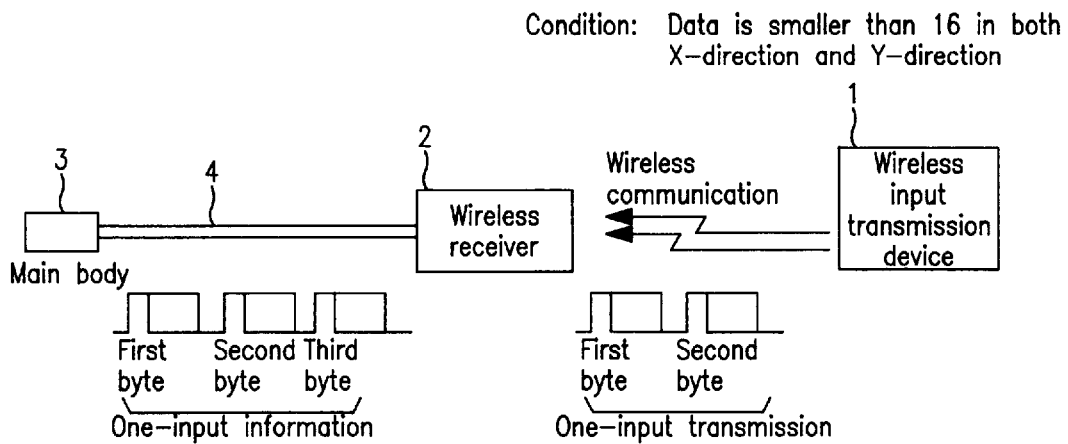
FIG. 4 (A) is a block diagram adding input information in an example of two-byte communication of wireless input transmission device in the wireless input device in the first embodiment of the invention.
Figure 4B:
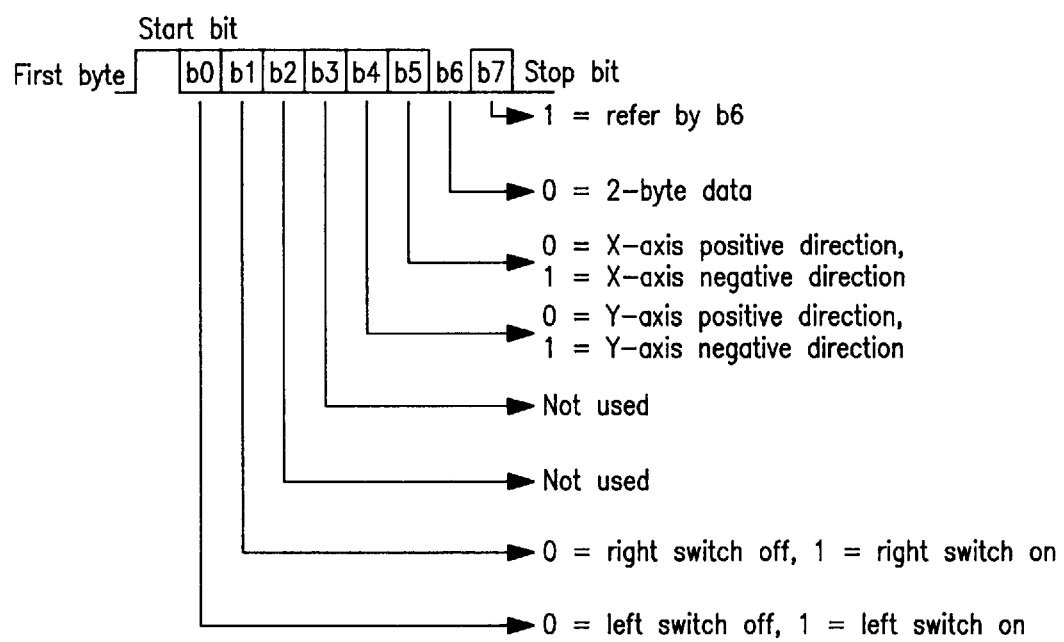
Figure 4B:
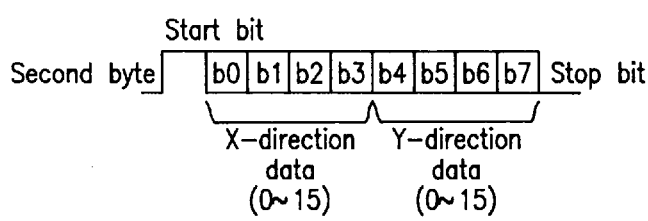

Then the input (wireless communication) data from the wireless input transmission device 1 is small in quantity, the operation is as follows. As shown in FIG. 4 (A), when the data in the X- and Y-direction are both smaller than 16, the number of digits necessary for the data is four bits, and therefore, as shown in FIG. 4 (B), bit 7, which is the first data quantity information of the first byte, is set to 1. Setting of bit 7 of the first byte to 1 means to refer to bit 6 of the first byte, and therefore when bit 6 or the second data quantity information bit is set to 0, data in X-direction is assigned in four digits from bit 0 to bit 3 of the second byte, and data in Y-direction in four digits from bit 4 to bit 7, that is, information of X and Y is assigned by four bits each, and one-input information can be transmitted to the wireless receiver 2 in two bytes.

Figure 5A:
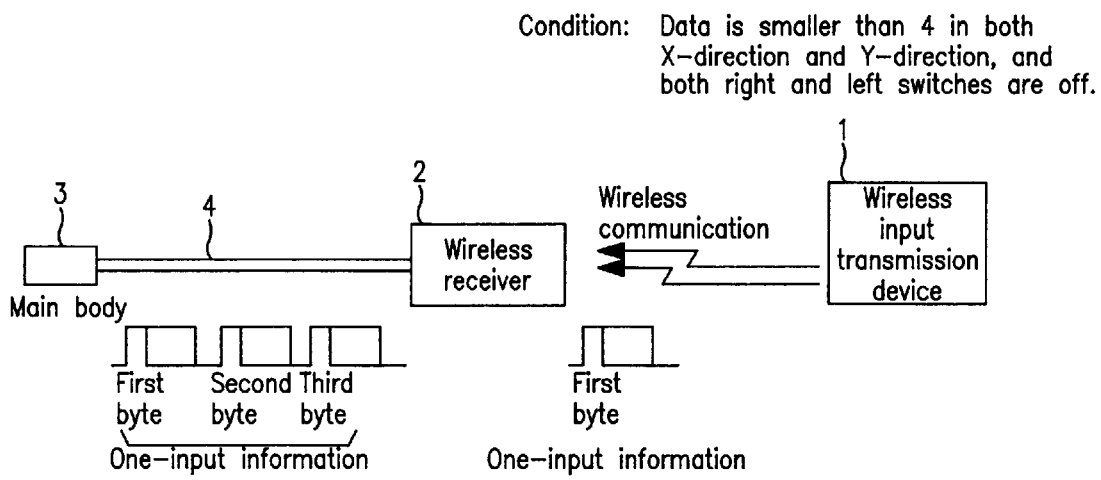
FIG. 5 (A) is a block diagram adding input information in an example of one-byte communication of wireless input transmission device in the wireless input device in the first embodiment of the invention.
Figure 5B:
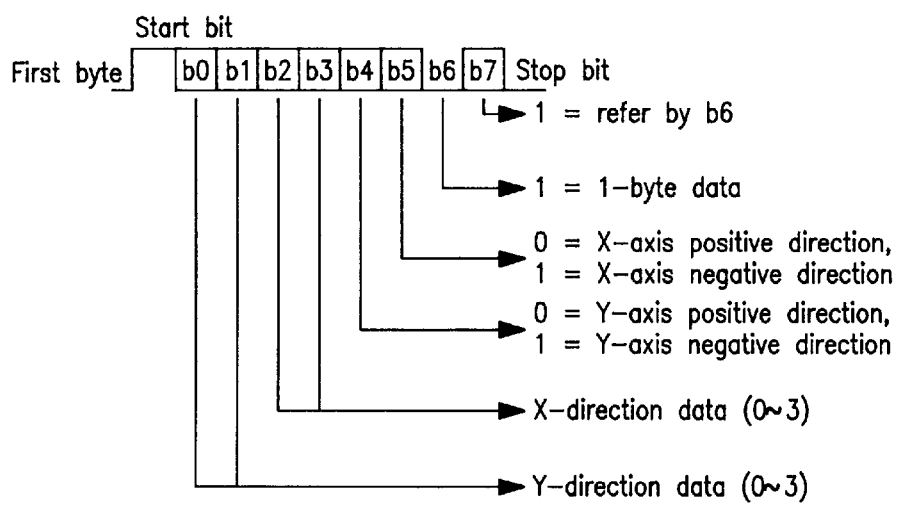

Then the input data from the wireless input transmission device 1 is further smaller, the operation is as follows. As shown in FIG. 5 (A), when the data is smaller than 4 in both X- and Y-directions, and the right and left switches 7 and 8 are both off, bit 7 which is the first data quantity information bit of the first byte is set to 1. It means, as mentioned above, to refer to bit 6, and when bit 6 or the second data quantity information bit is set to 1, it means to instruct to assign data in X-direction in two digits of bit 0 and bit 1 of the first byte, and data in Y-direction in two digits of bit 2 and bit 3. As a result, data in X- and Y-direction is assigned in four digits from bit 0 to bit 3, so that one-input information can be transmitted by wireless to the wireless receiver 2 in one byte only.

The two-byte data and one-byte data shown in FIG. 4 and FIG. 5 are received in the wireless receiver 2, and transformed into three-byte format for transmission to the main body 3 by judging the content of bit 6 and bit 7 of the first byte, and transmitted to the main body 3.

Thus, in this embodiment, by checking the content of the data to be transmitted and varying the number of bytes for wireless communication from the wireless input transmission device 1 to the wireless receiver 2, the electric power spent for communication can be saved, so that the battery life can be extended.

A second embodiment of the invention is described below.

The first embodiment shown in FIG. 4 and FIG. 5 is intended to curtail the number of bytes for communication from the viewpoint of the quantity of data of the content of one-input information, but from the viewpoint of the data quantity, however, always three-byte communication is required when the data quantity is large.

By contrast, in this embodiment, it is intended to curtail the number of bytes for communication when the difference from the previous communication content is small. That is, as shown in FIG. 6 (A), it is defined to be one byte when bit 6 as the second data quantity information bit of the first byte and bit 7 as the first data quantity information bit are 00, two bytes when 01, three bytes when 10, and equivalent to previous communication when 11, so that the one-input information to be transmitted is composed of plural bytes, and when same as previous communication content, by setting both bit 6 and bit 7 to 1, it is noticed to the wireless receiver 2 that it is same as the previous communication content by one byte only, so that communication can be done in one byte regardless of the number of digits of data.

Figure 6A:
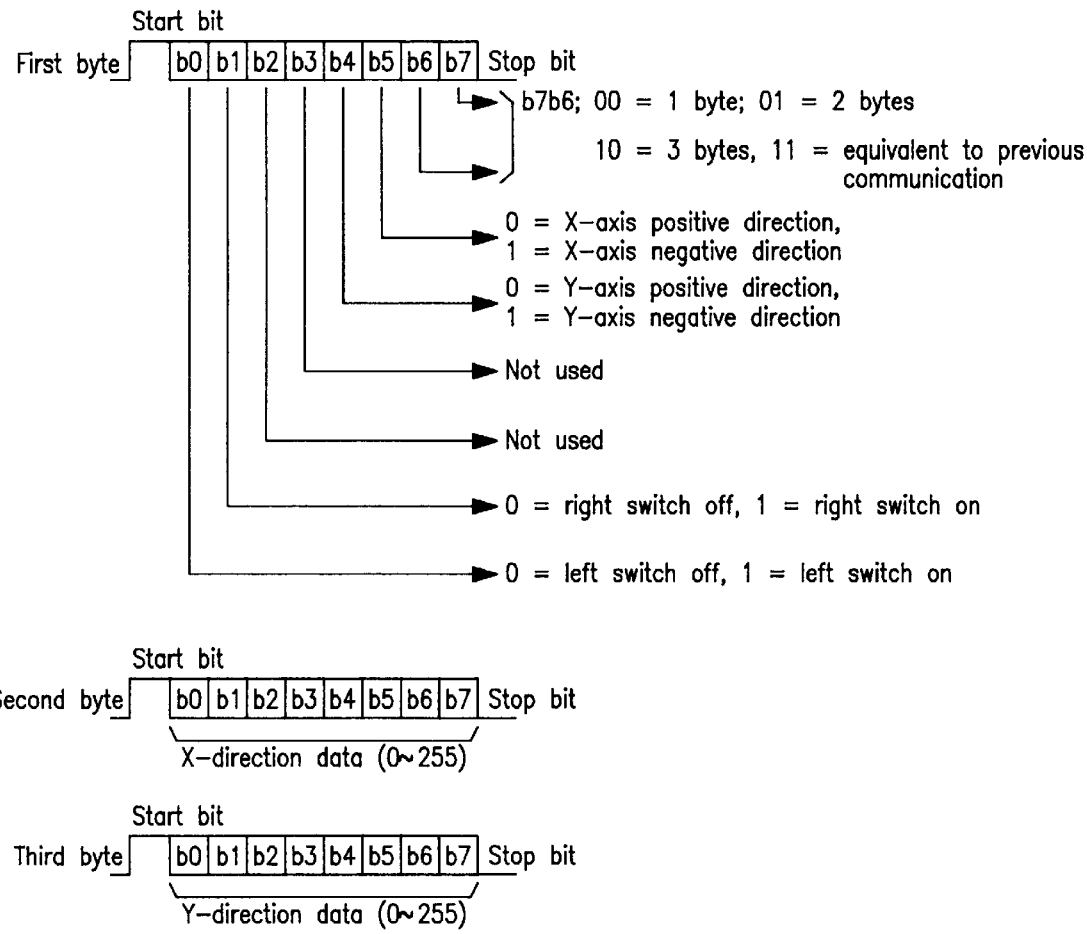
FIG. 6 (A) is a diagram showing a format of input information of wireless input transmission device of a wireless input device in a second embodiment of the invention.
Figure 6B:
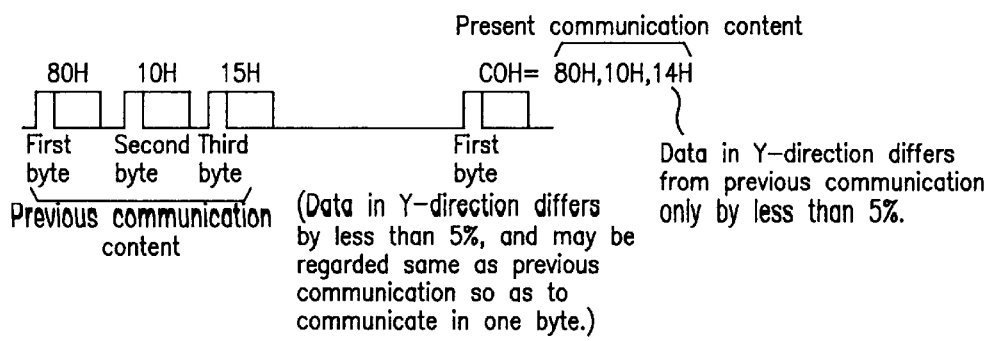

Also in this embodiment, if the difference of the data value from the previous communication content is less than 5%, for example, as shown in FIG. 6 (B), the first byte of the previous communication data is 80 H, second byte is 10 H, third byte is 15 H, and second byte of the present communication content is 10 H same as before and third byte is 14 H, it is regarded as an error not distinguished by human vision, and therefore b6 and b7 of the first byte in FIG. 6 (A) are set to 11 and first byte to C0H, and it is noticed that the present data is same as the previous communication, thereby enhancing the probability of communication in one byte and extending the battery life.

Figure 7A:
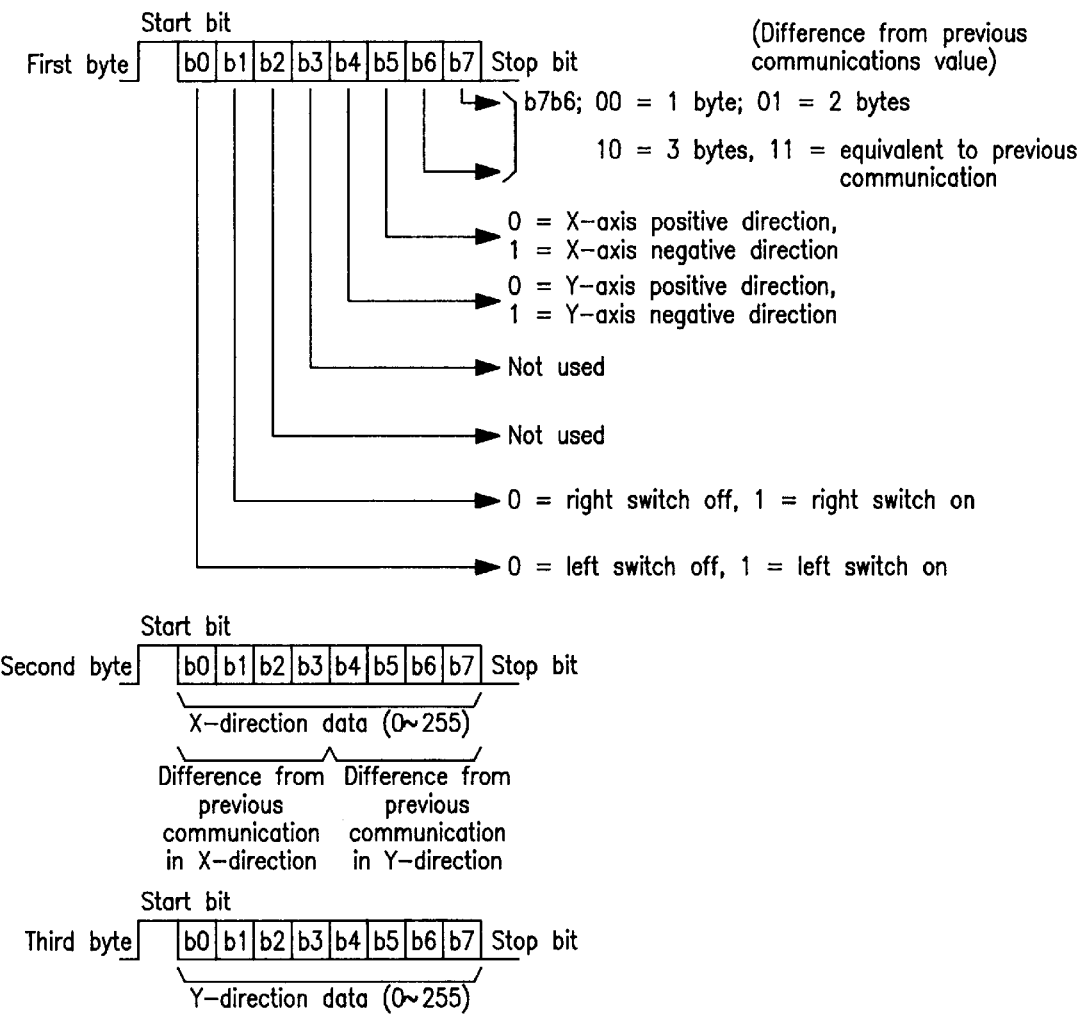
FIG. 7 (A) is a diagram showing a format of input information in an example of differential communication of wireless input transmission device of the wireless input device in the second embodiment of the invention.
Figure 7B:
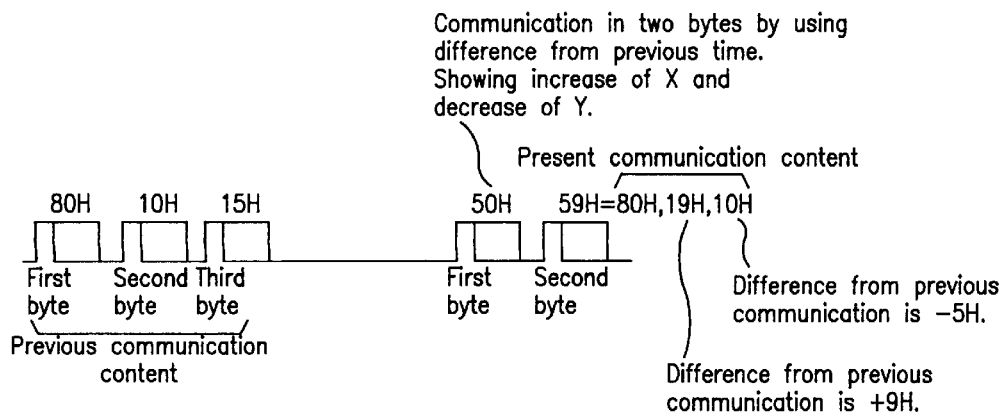

FIG. 7 refers to an embodiment of two-byte communication when the difference from the previous communication is less than 15, and as shown in FIG. 7 (A), by defining to be one byte when bit 6 and bit 7 are 00, two bytes when 01, three bytes when 10, and equivalent with the difference from the previous communication being less than 15 when 11, the difference from the previous communication of the X-direction data is communicated in four digits of bit 0 to bit 3 of the second byte and the difference from the previous communication of the Y-direction data is communicated in four digits of bit 4 to bit 7, and therefore if the values in the X-direction and Y-direction are large, as shown in FIG. 7 (B), when the previous communication is 80 H in the first byte, 10 H in the second byte, and 15 H in the third byte, and the present communication is 19 H in the second byte, being different from the previous time by +9 H, and 10 H in the third byte, being different from the previous time by −5 H, since the difference from the previous communication values is small, as shown in FIG. 7 (B), bit 6 and bit 7 of the first byte are set to 01, and the first byte is 50 H, and only the difference may be transmitted for the second byte, and the X-direction difference and Y-direction difference are transmitted in four bits each, or 59 H in a total of eight bits, so that the data for wireless communication can be transmitted in two bytes.

Whether the quantity of data is used or the difference from the previous communication value is used, or both are combined may be selected according to the device by investigating how the pointing device as input means is usually manipulated or checking the distribution of values communicated by manipulations, so that the battery life can be extended.

Figure 8:
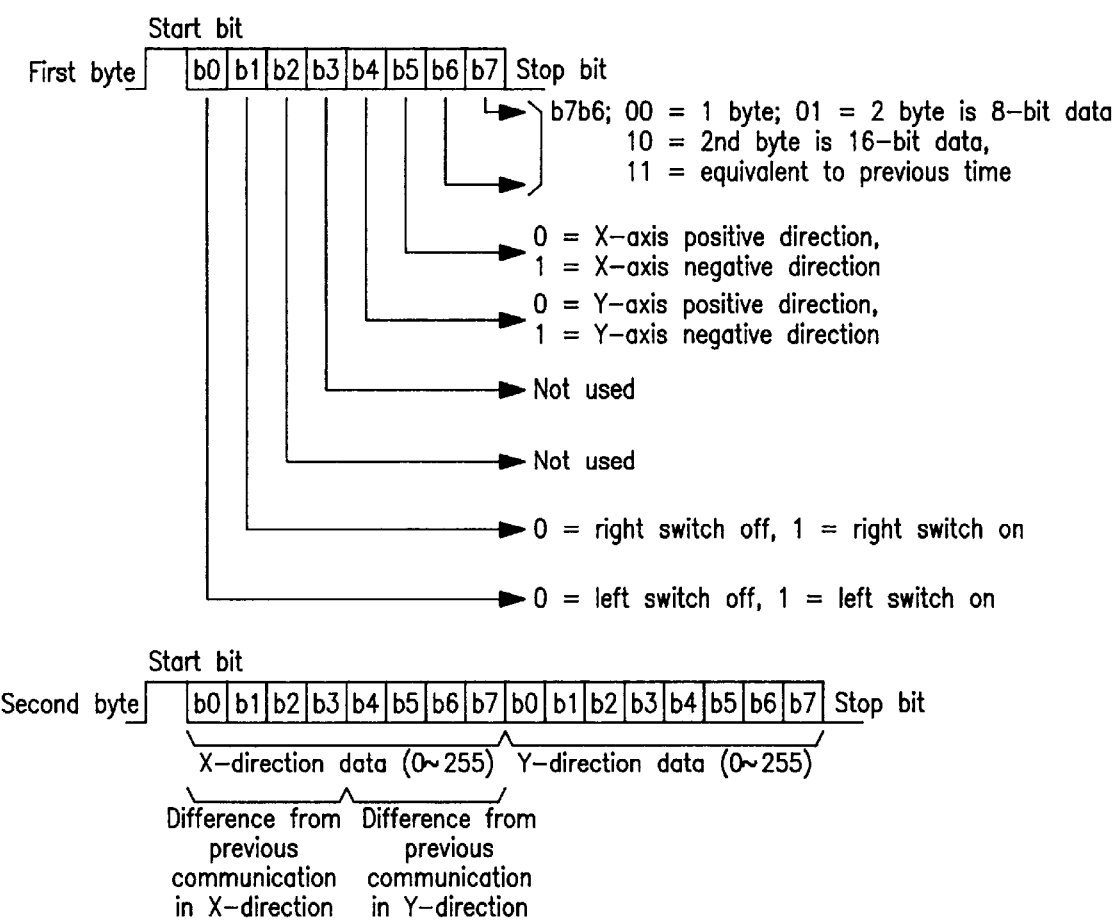
FIG. 8 is a diagram showing a format of input information in an example of shortening the bit length of wireless input transmission device of the wireless input device in the second embodiment of the invention.

Moreover, as shown in FIG. 8, by defining the first byte same as in FIG. 7, and the second byte 16 bits long, the number of bits may be decreased by using all 16 bits fully by dividing into eight bits each for X-direction data and Y-direction data depending on the content of data, or defining the difference from the previous time in four bits each in a total of eight bits, so that the same effects and actions as above may be obtained.

Thus, the invention comprises a wireless receiver, and a wireless input transmission device capable of communicating with the wireless receiver either one way or two ways, and possessing either keyboard switch or pointing device or both as input means, wherein when transmitting one-input information composed of one or plural bytes from the wireless input transmission device to the wireless receiver, it is designed to communicate by decreasing the number of plural bytes for composing the one-input information depending on the content of the data contained in the plural bytes, and therefore the current spent in communication can be saved and the battery life can be extended.

Or, the one-input information to be transmitted is composed of one or plural bytes, and when same as the previous communication content or nearly same, only the difference from the previous communication content is transmitted, or the information telling that the present data is same as the previous communication is sent, and therefore by communicating by decreasing the number of bytes, the current spent in communication can be saved, and the battery life can be extended.

Instead of decreasing the number of bytes, the number of bits for composing one byte is decreased, and similarly the current spent in communication can be saved, and the battery life can be extended.

The invention may be applied in other various forms without departing from the true spirit and principal features thereof. For example, aside from the household game machine presented at the beginning, it may be similarly applied in information processing appliances such as personal computer and word processor.

The explanation herein relates to one-way communication from the wireless input transmission device to wireless receiver, but it may be also applied in two-way communication.

The number of bit, number of bytes and other numerical values are only examples, and the invention is not limited to them alone, and the first embodiment and second embodiment may be also combined. For example, when the data quantity information bits in the first embodiment are composed in three bits by using the idle bits, the first bit may mean to refer to the second bit, and the second bit decreases the data digits to half or shows to refer to the third bit, and the third bit decreases the data bit to one quarter or tells the data is same, so that omission of data communication may be noticed, and thus the first embodiment and second embodiment can be combined.

In the foregoing embodiments, the input means of the wireless input transmission device was pointing device, but instead of the pointing device, the keyboard may be also used, or the pointing device and keyboard may be used together.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A wireless input device comprising:
   a wireless receiver for communicating with a main apparatus by wire, and
   a wireless input transmission device having data input means for communicating with said wireless receiver either one way or two ways,
   wherein at least when transmitting transmission data from said wireless input transmission device to said wireless receiver, one or more bytes having data quantity information bits are transmitted, said data quantity information bits indicate that a) the transmission data are decreased in the number of data digits, or b) that said data digits are omitted, in order to decrease the number of transmission bytes or the number of bits in each of said transmission bytes.

2. A wireless input device of claim 1, wherein said data quantity information bits possess first and second data quantity information bits, said first data quantity information bit instructs whether or not to decrease the number of digits of transmission data, and said second data quantity information bits instructs whether to decrease the number of digits of transmission data to one half or to one quarter.

3. A wireless input device of claim 1, wherein said data quantity information bits possess first to third data quantity information bits, said first data quantity information bit instructs whether or not to decrease the number of digits of transmission data, said second data quantity information bit instructs whether to decrease the number of digits of transmission data to one half or to further less, and said third data quantity information bit instructs whether to decrease the number of digits of transmission data to one quarter or to equivalent to previous time to omit transmission of data.

4. A wireless input device comprising:

a wireless receiver for communicating with a main apparatus by wire, and a wireless input transmission device having data input means for communicating with said wireless receiver either one way or two ways, wherein at least when transmitting transmission data from said wireless input transmission device to said wireless receiver, one or more bytes having data quantity information bits are transmitted, said data quantity information bits transmit the transmission data fully or transmit only the difference from the previous communication data when the numerical value of the transmission data is less than a certain size, or transmission of data is omitted, in order to decrease the number of transmission bytes or the number of bits in each of said transmission bytes.

5. A wireless input method comprising:

entering data in a wireless input transmission device, checking a data value of said entered data in the wireless input transmission device, determining the number of digits of transmission data depending on the data value of said entered data in the wireless input transmission device, applying the number of digits of transmission data determined in the wireless input transmission device to a data quantity information bit, composing transmission data of one or plural bytes of data to be transmitted in the wireless input transmission device, data quantity information bit and necessary data, and transmitting said data quantity information bit by preparing transmission data decreased in the number of digits of data and decreased in the number of transmission bytes when the value of the transmission data is small, and receiving the transmitted transmission data and decoding the transmitted data according to the data quantity information bit in a wireless receiver.

6. A wireless input method of claim 5, wherein omission of transmission of data is indicated by the data quantity information bit when the data value to be transmitted is similar to the previous transmission, at the step of checking the data value of said entered data or the step of transmitting by preparing said communication data, in the wireless input transmission device.

7. A wireless input method of claim 5, wherein transmission of difference from the previous transmission data is indicated by the data quantity information bit when the data value to be transmitted is different from the previous transmission, at the step of checking the data value of said entered data or the step of transmitting by preparing said communication data, in the wireless input transmission device.

8. A wireless input method of claim 5, wherein the transmission data decreased in the number of digits of data in the transmission byte is prepared and transmitted when the data value to be transmitted is below a predetermined value at the step of transmitting by preparing said transmission data, in the wireless input transmission device.

9. A wireless input transmission device for use with a pointing device and for communicating with a wireless receiver, comprising:

means for receiving at least one of an X-direction signal and a Y-direction signal from said pointing device;

means for forming an information signal which includes:
a) at least one of X-direction data and Y-direction data corresponding to said X-direction signal and said Y-direction signal respectively; and
b) a plurality of data quantity information bits indicating assignment of said at least one of said X-direction data and Y-direction data in said information signal, said plurality of data quantity information bits including a first data quantity information bit and a second data quantity information bit for indicating decreased assignment of said at least one of said X-direction data and said Y-direction data in said information signal; and means for transmitting said information signal to said wireless receiver.

10. A wireless input transmission device according to claim 9, wherein said second data quantity information bit indicates that assignment of said at least one of said X-direction signal and said Y-direction signal is to be decreased by one of a) one half and b) one quarter.

11. A wireless input transmission device according to claim 9, wherein said pointing device is for moving an object on a screen and wherein at least one of said X-direction data and said Y-direction data indicates position of said object on said screen.

12. A wireless input transmission device according to claim 11, wherein said pointing device is for moving an object on a screen and wherein at least one of said X-direction data and said Y-direction indicates change of position of said object on said screen.

13. A method for communicating with a wireless receiver, comprising:

receiving at least one of a X-direction signal and a Y-direction signal from a pointing device;

forming an information signal which includes:
a) at least one of X-direction data and Y-direction data corresponding to said X-direction signal and said Y-direction signal respectively; and
b) a plurality of data quantity information bits indicating assignment of said at least one of said X-direction data and Y-direction data in said information signal, said plurality of data quantity information bits including a first data quantity information bit and a second data quantity information bit for indicating decreased assignment of said at least one of said X-direction data and said Y-direction data in said information signal; and transmitting said information signal to said wireless receiver.

14. A method for communicating with a wireless receiver according to claim 13, wherein said second data quantity information bit indicates that assignment of said at least one of said X-direction signal and said Y-direction signal is to be decreased by one of a) one half and b) one quarter.

15. A method for communicating with a wireless receiver according to claim 13, further comprising the step of generating said at least one of said X-direction data and said Y-direction data by manipulating a pointing device in order to move an object on a screen, wherein at least one of said X-direction data and said Y-direction data indicates position of said object on said screen.

16. A method for communicating with a wireless receiver according to claim 13, further comprising the step of generating said at least one of said X-direction data and said Y-direction data by manipulating a pointing device in order to move an object on a screen wherein at least one of said X-direction data, and said Y-direction data indicate change of position of said object on said screen.

* * * * *